INVENTOR.
Howard L. Rathman.
BY
M. Talbert Dick
ATTORNEY.

United States Patent Office 3,033,193
Patented May 8, 1962

3,033,193
HOT AIR FURNACE HUMIDIFIER
Howard L. Rathman, 1302 Valley Crest Blvd.,
Annandale, Va.
Filed Dec. 28, 1959, Ser. No. 862,377
1 Claim. (Cl. 126—113)

This invention relates to a humidifier for building furnaces and the like, and more particularly to a mechanical device that introduces a greater amount of water molecules into the air than by mere surface evaporation from an open water reservoir.

One of the chief problems of obtaining comfortable and healthful living conditions during the colder months of the year is the saturating of the air with a sufficient amount of water molecules. Most hot air type furnaces partially solve this problem by having an open water reservoir in the hot air take-off duct. The moisture entering the air is by way of evaporation of the surface of the water in the furnace reservoir. Obviously, due to the inherent restrictions in the surface area of an open water reservoir inside a furnace, this is not of sufficient amount for good health. The result is that the breathing air of the building is dry and does not have sufficient moisture content.

Therefore, one of the principal objects of my invention is to provide a powered mechanical feed device for use on furnaces that will introduce a suitable amount of water molecules into the air mass of a building.

A further object of this invention is to provide a mechanical feed humidifier for furnaces that may be easily and quickly installed thereon.

A still further object of my invention is to provide a powered humidifier for furnaces, that when the power means is not operating, the device will operate as an ordinary furnace reservoir humidifier by capillary action.

Still further objects of my invention are to provide a motorized humidifier for furnaces that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawing, in which:

Figure 2:
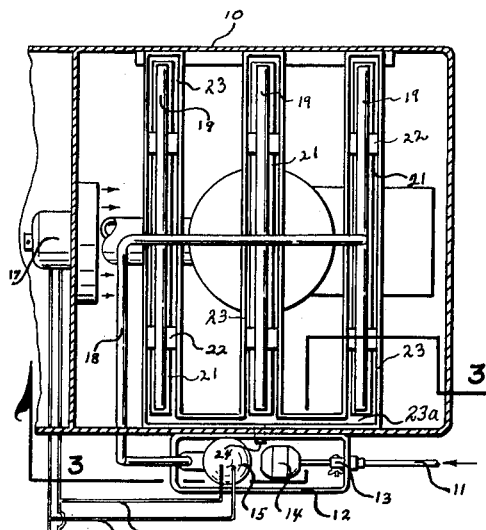
FIG. 2 is a top plan view of my device installed in a furnace with the top section of the furnace cut away at line 2—2 of FIG. 1 and illustrates the position of my device inside the furnace.
Figure 4:
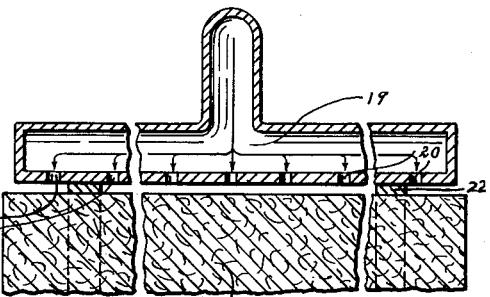
FIG. 4 is a cross-sectional view of the humidifier element itself and illustrates the means of supplying water directly thereto. This figure is taken on line 4—4 of FIG. 3.

The numeral 10 designates the furnace proper in which my humidifier is installed. The numeral 11 designates the pipe that is the water source. The numeral 12 designates the water reservoir for the humidifier. The numeral 13 designates a float type valve to keep the water level in reservoir 12 constant. The numeral 14 designates the float for valve 13. The numeral 15 designates the electric pumping device that is electrically connected by wires 16 to the hot air blower 17 and is thusly operated at the same time. The numeral 18 designates the tube through which the water from reservoir 12 is pumped by pumping device 15. The numeral 19 designates the tubular arms of pipe 18. The numeral 20 designates the holes in arms 19 through which the water passes to saturate elements 21, which are composed of a porous material and which extends vertically from arms 19 and are retained by members 22 and provides for a great retention of water in the furnace whether the blower 17 and pump 15 are turned on or not and also several large areas from which the water will evaporate. The numeral 23 designates a trough member or tray under each element 21. These troughs 23 are connected to a common collection trough 23a that carries the excess water from the elements 21 back to the reservoir 12 by way of tube 24.

Figure 3:
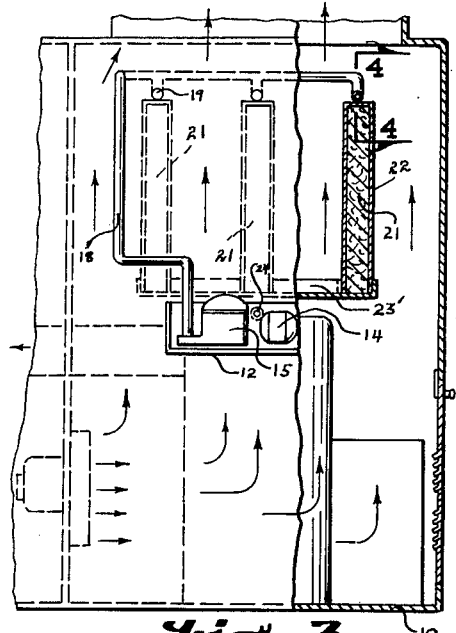
FIG. 3 is a side plan view of my device installed in a furnace taken on line 3—3 of FIG. 2 and further illustrates the position of my device in relation to the flow of air through the hot air circulating duct.
Figure 1:
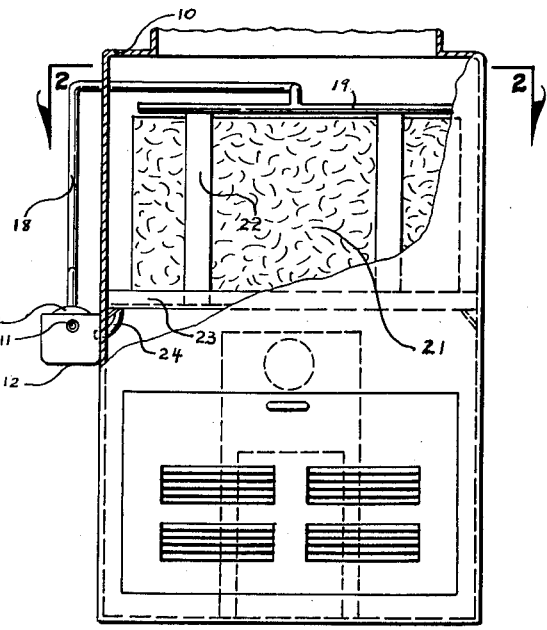
FIG. 1 is a side, partially cut away, view of my humidifier installed in a furnace.

The practicable operation of the device is as follows. With the plates or like 21 water saturated, the warm furnace air will pass upwardly at each side of the plates as shown in FIG. 3, thereby acquiring the desired moisture. Each time the blower fan goes on, water will be passed through the tube 18 and onto the top of the plates. The amount of humidity may be adjusted by many means, such as by the size of the various liquid pipes, imposed valves, or by providing a water pump of variable speed. The plates 21 may be of any suitable material such as synthetic or plastic sponge, rubber-like sponge, or even ceramic materials. Obviously, when the blower fan is idle, no water will be pumped onto the plates 21. If there is too much water supplied to the plates at any given time, it will run down into the tray members 23, thence back into the tank 12, through the connecting trough and pipe 24. These trays also prevent any objectionable dripping of water from the plates onto other parts of the furnace.

Some changes may be made in the construction and arrangement of my humidifier without departing from the real spirit and purpose of my invention, and it is my intention to cover by my claim any modified forms of structure or use of mechanical equivalents which may be reasonably included within its scope.

I claim:

In combination, a hot air furnace having a hot air collecting and distributing zone, and a humidifying means therein comprising; collecting troughs disposed in the hot air collecting and distributing zone of said furnace, vertical water absorbing plate members each having its bottom edge directly in a respective one of said troughs and within the hot air collecting and distributing zone of said furnace; said plate members being spaced apart from each other and said trough members being spaced apart from each other to permit upward flow of hot air therebetween, perforated conduits respectively above each of said plate members, a reservoir in communication with a source of water supply, said reservoir having means to maintain a level of water therein below the level of said troughs, a water pump having its intake operatively communicating with the inside of said reservoir, a pipe means connecting the outlet of said pump to each of said perforated conduits, and a conduit means having one end operatively communicating with the inside of said troughs and its other end communicating with said reservoir at a level below said troughs; said furnace having an electric fan; said pump being electrically actuated and a common electric circuit for said fan and pump whereby when said fan is running said pump will also be operating.

References Cited in the file of this patent
UNITED STATES PATENTS

| | | |
|---|---|---|
| 2,158,294 | Long | May 16, 1939 |
| 2,158,543 | Jensen | May 16, 1939 |
| 2,268,540 | Andrews | Jan. 6, 1942 |
| 2,557,042 | Woolley | June 12, 1951 |
| 2,637,540 | Rowe | May 5, 1953 |